(12) United States Patent
Hong et al.

(10) Patent No.: US 8,557,435 B2
(45) Date of Patent: Oct. 15, 2013

(54) SECONDARY BATTERY

(75) Inventors: Ki-Sung Hong, Suwon-si (KR); In-Kyu Park, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 634 days.

(21) Appl. No.: 12/126,432

(22) Filed: May 23, 2008

(65) Prior Publication Data

US 2008/0292956 A1 Nov. 27, 2008

(30) Foreign Application Priority Data

May 25, 2007 (KR) ........................ 10-2007-0050646

(51) Int. Cl.
*H01M 2/02* (2006.01)

(52) U.S. Cl.
USPC ............ 429/164; 429/167; 429/178; 429/186

(58) Field of Classification Search
USPC ............. 429/164, 176, 175, 27, 90, 186, 163, 429/167; 320/107, 112
See application file for complete search history.

(56) References Cited

U.S. PATENT DOCUMENTS

| | | | |
|---|---|---|---|
| 1,587,356 A * | 6/1926 | Riebeth .......................... | 429/157 |
| 2,767,238 A * | 10/1956 | Griner .............................. | 429/90 |
| 2,907,809 A * | 10/1959 | Southworth, Jr et al. ....... | 429/27 |
| 2003/0049522 A1 * | 3/2003 | Doomernik ..................... | 429/93 |
| 2005/0221175 A1 * | 10/2005 | Yoon .............................. | 429/164 |
| 2006/0266542 A1 | 11/2006 | Yoon | |

FOREIGN PATENT DOCUMENTS

| | | |
|---|---|---|
| CN | 1670983 A | 9/2005 |
| EP | 1 524 710 | 4/2005 |
| JP | 10-21890 | 1/1998 |
| JP | 2002-184364 | 6/2002 |
| JP | 2004-022234 | 1/2004 |
| JP | 2004-327176 | 11/2004 |
| JP | 2005-135770 | 5/2005 |
| JP | 2005-158452 | 6/2005 |
| JP | 2005-276571 | 10/2005 |
| JP | 2006-302662 | 11/2006 |
| KR | 2006-86720 | 8/2006 |
| KR | 2006-113802 | 11/2006 |
| WO | WO 2006/046343 | 5/2006 |
| WO | WO 2006/104331 | 10/2006 |

OTHER PUBLICATIONS

Machine translation of: Jeon, KR 10-2006-0086720, Aug. 1, 2006.*

(Continued)

*Primary Examiner* — Kenneth Douyette
(74) *Attorney, Agent, or Firm* — Christie, Parker & Hale, LLP

(57) ABSTRACT

A secondary battery includes a bare cell including an electrode assembly and a can or a pouch-shaped casing accommodating the electrode assembly and having a stepped portion; a protection circuit board disposed at a side of the bare cell; and a label adhered on a side surface of the bare cell. Further, another secondary battery includes a bare cell; a protection circuit board; an outer case member disposed at a side surface of the bare cell and having a stepped portion; and a label adhered on the outer case member. A label overlapping portion is disposed in the stepped portion formed in an outer surface of a can or a pouch-shaped casing or in an outer case member, and thus it is possible to prevent the secondary battery from being thicker at the label overlapping portion than at other regions and to uniformly maintain the outer thickness of the battery.

28 Claims, 6 Drawing Sheets

(56) References Cited

OTHER PUBLICATIONS

Office Action issued by Korean Intellectual Property Office in Korean Patent Application No. 2007-50646 on May 1, 2008.

Office Action issued Aug. 7, 2009 in corresponding Chinese Patent Application No. 200810098339.4.

Notice of Allowability issued in Korean Patent Application No. 2007-50646 on Aug. 7, 2008.

Search Report issued in European Patent Application No. 08156800.8 on Aug. 25, 2008.

Japanese Office action dated Jan. 18, 2011, for corresponding Japanese Patent application 2007-214483, noting listed references in this IDS, as well as JP 2004-327176, previously filed in an IDS dated May 23, 2008.

Patent Abstracts of Japan and English machine translation of Japanese Publication 2002-184364 listed above, 26 pages.

Patent Abstracts of Japan and English machine translation of Japanese Publication 2005-276571 listed above, 15 pages.

Japanese Notice of Allowance dated Jul. 5, 2011, for corresponding Japanese Patent application 2007-214483, 2 pages.

Patent Abstracts of Japan, and English machine translation of Japanese Publication 2006-302662, listed above, 21 pages.

* cited by examiner

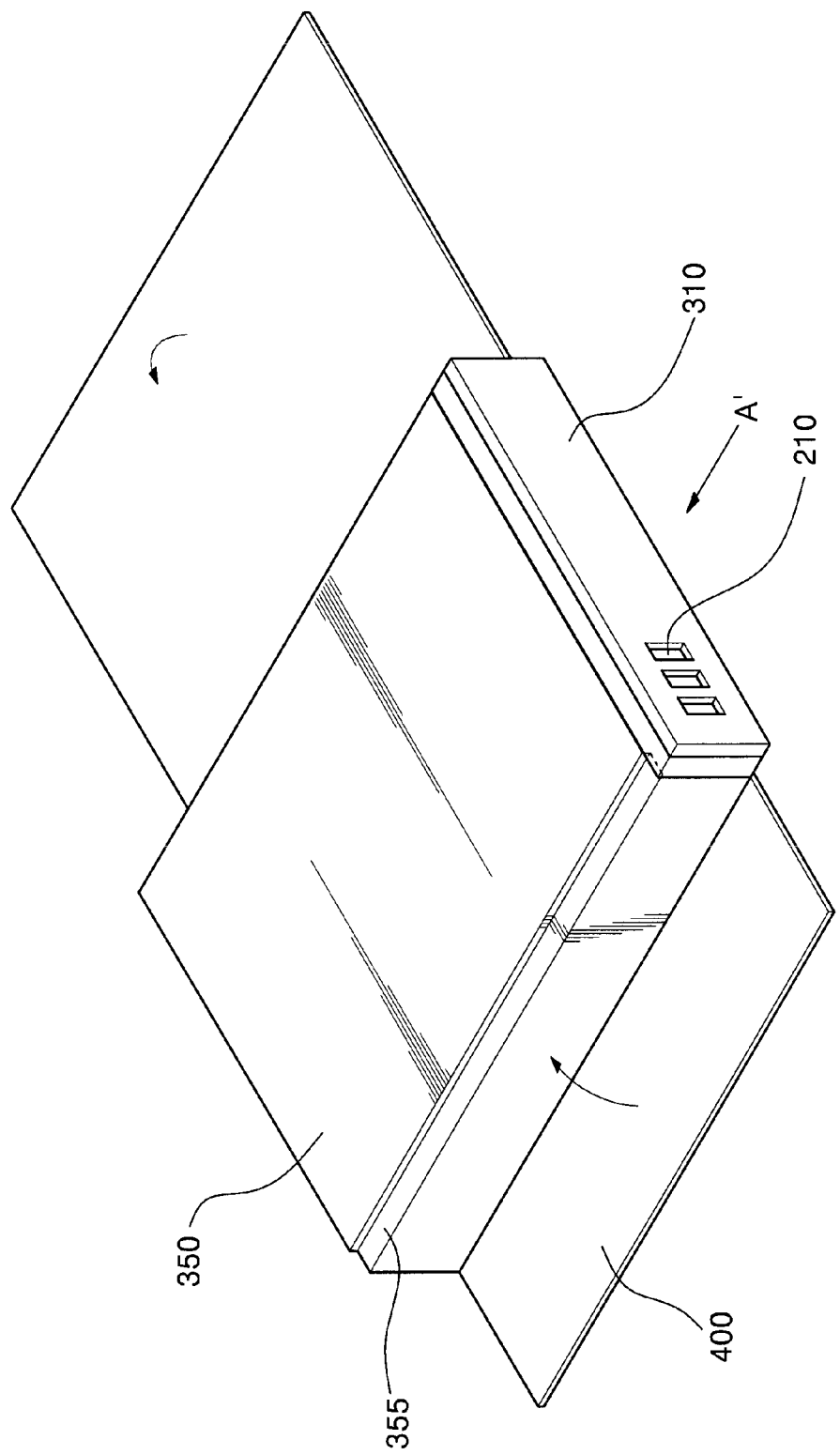

SECONDARY BATTERY

CROSS-REFERENCE TO RELATED APPLICATION

This application claims the benefit of Korean Application No. 2007-50646, filed May 25, 2007 in the Korean Intellectual Property Office, the disclosure of which is incorporated herein by reference.

BACKGROUND OF THE INVENTION

1. Field of the Invention

Aspects of the present invention relate to a secondary battery, and more particularly, to a lithium secondary battery having an improved structure of a can or a case to keep the outer thickness of the secondary battery uniform.

2. Description of the Related Art

As the information society has been rapidly developing, users' need for smaller, lighter and multi-functional devices has increased. Thus, portable electronic devices (such as PDAs, GPSs, camcorders, mobile phones, etc.) employ batteries as their main power source. To make devices smaller and lighter, secondary batteries, which have a high energy density and are rechargeable, are adopted for most battery power source needs.

In particular, since lithium is light, lithium secondary batteries have a higher energy density per unit weight and a faster charging ability than conventional lead storage batteries, nickel-cadmium batteries, nickel-hydrogen batteries, nickel-zinc batteries, etc., and thus are widely used.

A secondary battery is typically formed by putting an electrode assembly including a positive electrode, a negative electrode and a separator into a can, which is typically formed of aluminum or an aluminum alloy, covering the can with a cap assembly, injecting an electrolyte into the can, and sealing the can. The term "bare cell" is used herein to refer to the sealed can containing the electrode assembly and electrolyte and including the cap assembly, before additional components such as safety devices, additional outer cases, labels, etc., are added.

While the can may be formed of a material such as iron, aluminum or an aluminum alloy provides advantages as a material forming a can in that the battery can be lightweight and not decay over a long period of use under high voltage.

Batteries have a possibility to output high energy as a power source. A secondary battery accumulates high energy in itself in a charged state and also accumulates energy provided from another energy source while charging. When defects such as an inner short-circuit occur in the secondary battery during charging or in a charged state, the energy accumulated in the battery may be emitted in a short period time, thereby causing safety problems such as ignition, explosion, etc.

Lithium secondary batteries may easily ignite or explode in the event of a battery error because of the high activity of lithium itself. Lithium ion batteries are more stable than batteries employing metallic lithium, since only ionic lithium, not metallic lithium, remains therein. Nevertheless, materials such as the negative electrode or nonaqueous solvent used in the battery still have a risk of ignition or explosion in the event of a battery error, because they are flammable.

Accordingly, the secondary battery may include several safety devices to prevent ignition or explosion caused by battery error in a charged state or during a charging step. The safety devices are connected with positive and negative terminals of the bare cell by a conductive structure commonly called a lead plate.

These safety devices prevent hazards (i.e., explosion, ignition, etc.) of a battery by blocking current when the voltage of the battery is abruptly increased due to an increase in temperature or excessive charging/discharging. The safety device, which includes a protection circuit for sensing abnormal current or voltage and blocking current flow, a positive temperature coefficient (PTC) device operated by overheating due to the abnormal current, or a biometal, is connected to the bare cell.

The secondary batteries having a circuit part containing a safety device, etc., connected to a bare cell with a molded resin are broadly classified into two types depending on an outer shape in the final application. The two types are a hard pack battery and an inner pack battery. In the hard pack battery, a terminal (outer terminal) electrically connected to an external device is exposed and a housing formed of plastic resin is integrated with an outer surface of the battery. In the inner pack battery, an outer terminal is exposed and a housing formed of plastic resin is not separately molded on an outer surface of the battery but a label is wrapped.

The inner pack battery can be used irrespective of the shape and structure of the external device, and can be made in slim and various designs, thereby being widely applied to various products such a slim mobile phone and is rapidly standardized.

Meanwhile, with the trend to miniaturization of electronic devices employing secondary batteries, the need for smaller, and more specifically, thinner secondary batteries which provide energy to an electronic device is increasing.

In general, it is desirable for the secondary battery to be formed to a thickness of 4.7 mm±0.1 mm, which may be changed a little according to the product in which the battery is to be used. Since a battery becomes thicker in its middle part during use of the battery because of a swelling phenomenon, the middle part should have a thickness of 4.7 mm or less in an un-swelled state in order to have a swelled thickness of 4.7 mm.

Accordingly, when a film-type label is wrapped on the outer surface of the bare cell, the label overlaps itself at a certain part of the bare cell for stronger attachment, and thus a region in which the label overlaps itself (i.e., a label overlapping portion) is formed.

That is, the battery is thicker because of the thickness of the label, particularly at the label overlapping portion, which makes thickness management of the secondary battery difficult. The increase in thickness due to the thickness of the label may not be reduced by management, so that another cause of thickness difference, that is, a thickness difference of a can, has to be strictly controlled.

SUMMARY OF THE INVENTION

Aspects of the present invention provide a secondary battery having an improved structure to form a stepped portion accommodating a label overlapping portion in a can or a pouch-shaped casing to thereby maintain uniformity of the outer thickness of the secondary battery.

Aspects of the present invention also provide a secondary battery having an improved structure to form a stepped portion accommodating a label overlapping portion in an outer case to thereby make maintain uniformity of the outer thickness of the secondary battery.

According to an embodiment of the present invention, a secondary battery includes: a bare cell including an electrode assembly and a can or a pouch-shaped casing accommodating the electrode assembly; a protection circuit board electrically connected to the bare cell; and a label adhered on a side surface of the bare cell, wherein the side surface of the bare cell has a stepped portion.

According to another embodiment of the present invention, there is provided a secondary battery comprising: a bare cell having an electrode assembly disposed in an interior thereof, the bare cell having a first end and a second end and one or more side surfaces between the first end and the second end; a label that wraps entirely around the bare cell on the one or more side surfaces, the label including a label overlapping portion where a first end of the label overlaps a second end of the label, wherein the one or more side surfaces includes a stepped recess that accommodates the label overlapping portion.

According to another embodiment of the present invention, a secondary battery includes: a bare cell including an electrode assembly and a can or a pouch-shaped casing accommodating the electrode assembly; a protection circuit board electrically connected to the bare cell; an outer case member that surrounds side surfaces of the bare cell; and a label adhered on the outer case member, wherein the outer case member has a stepped portion.

According to another embodiment of the present invention, there is provided a secondary battery comprising: a bare cell having an electrode assembly disposed in an interior thereof, the bare cell having a first end and a second end and one or more side surfaces between the first end and the second end; an outer case member that surrounds the one or more side surfaces; a label that wraps entirely around the outer case member, the label including a label overlapping portion where a first end of the label overlaps a second end of the label, wherein the outer case member includes a stepped recess that accommodates the label overlapping portion.

According to an aspect of the present invention, the stepped portion may define a label overlap accommodating space in which a label overlapping portion of the label is accommodated.

According to an aspect of the present invention, the height of the stepped portion may be 90%~110% of the thickness of the label.

According to an aspect of the present invention, the width of the stepped portion may be more than 5 mm and less than 10 mm.

According to an aspect of the present invention, the stepped portion may be formed by pressing a surface of the bare cell or outer case member.

According to an aspect of the present invention, the stepped portion may be formed by cutting a surface of the bare cell or outer case member.

According to an aspect of the present invention, the step may be formed at an edge of a side surface of the can or pouch-shaped casing, or in a middle part of the bare cell or outer case member.

According to an aspect of the present invention, the bare cell may be a lithium ion cell or a lithium polymer cell.

According to an aspect of the present invention, the bare cell may be formed in a prismatic, cylindrical or pouch shape.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 2B is a perspective view of the secondary battery of FIG. 2A in which a label is partially wrapped;

DETAILED DESCRIPTION OF THE EMBODIMENTS

Figure 1A:
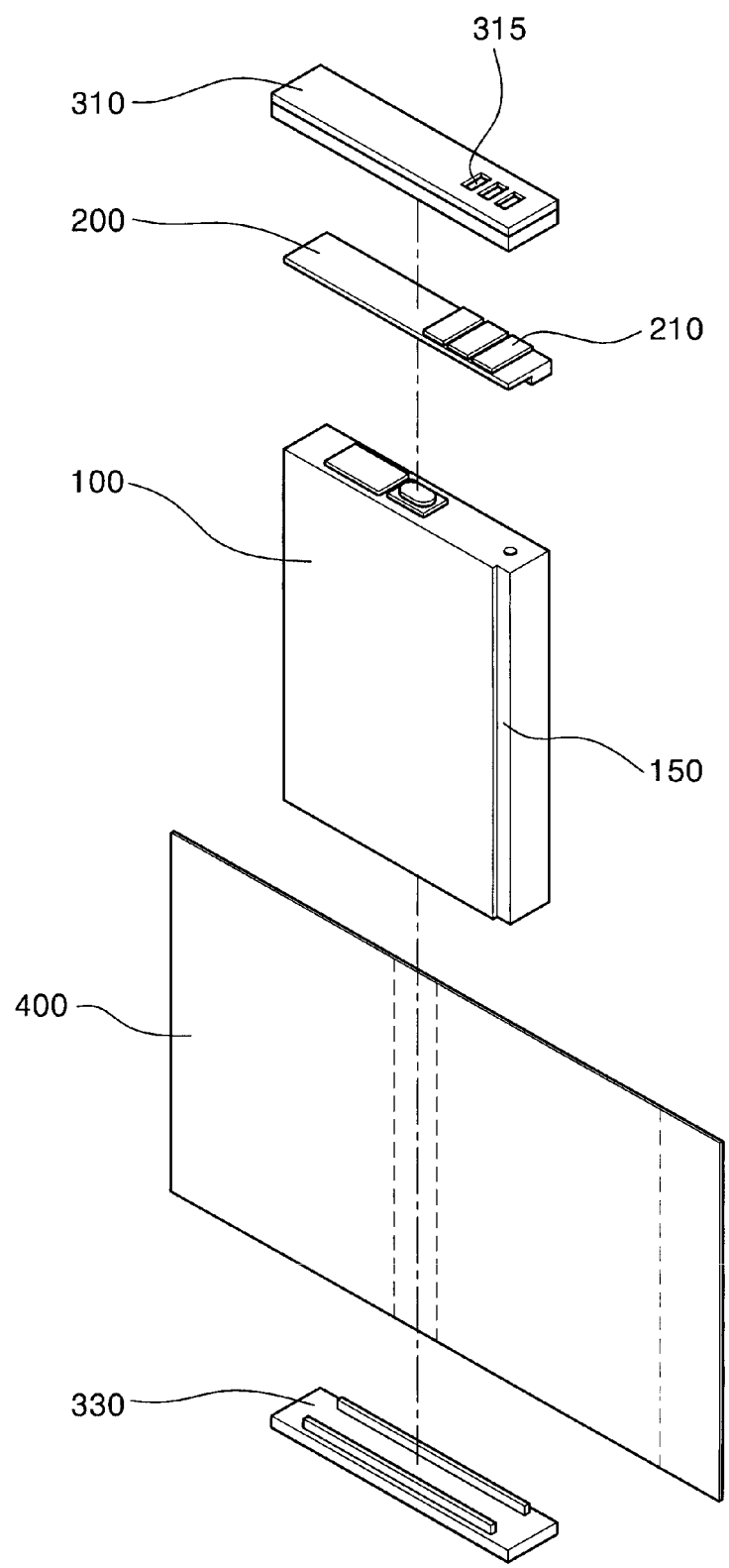
FIG. 1A is an exploded perspective view of a secondary battery according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

In discussing the secondary battery herein, the terms such as "up," "upper," "upward," "above," and "top" are used in reference to the direction from the closed end of the bare cell 100 towards the end of the bare cell 100 having the cap assembly, and terms such as "down," "downward," "downwardly" "low," "lower," "below" and "bottom" are used in reference to the direction from the end of the bare cell 100 having the cap assembly and towards the closed end. In other words, terms regarding orientation of components and structures of the secondary battery are used herein from the perspective of the secondary battery resting on its closed end. It is to be understood, of course that the secondary battery can be used in any orientation. Terms such as "inward" and "inwardly" refer generally to a direction toward the interior of the battery and terms such as "outward" and "outwardly refer generally to a direction away from the interior of the battery. Terms such as "side" or "side surface" refer to an exterior portion of the bare cell 100 between the end of the bare cell 100 having the cap assembly cap assembly and the closed end of the bare cell 100, that is, the end of the bare cell 100 not having the cap assembly cap assembly.

Figure 1B:
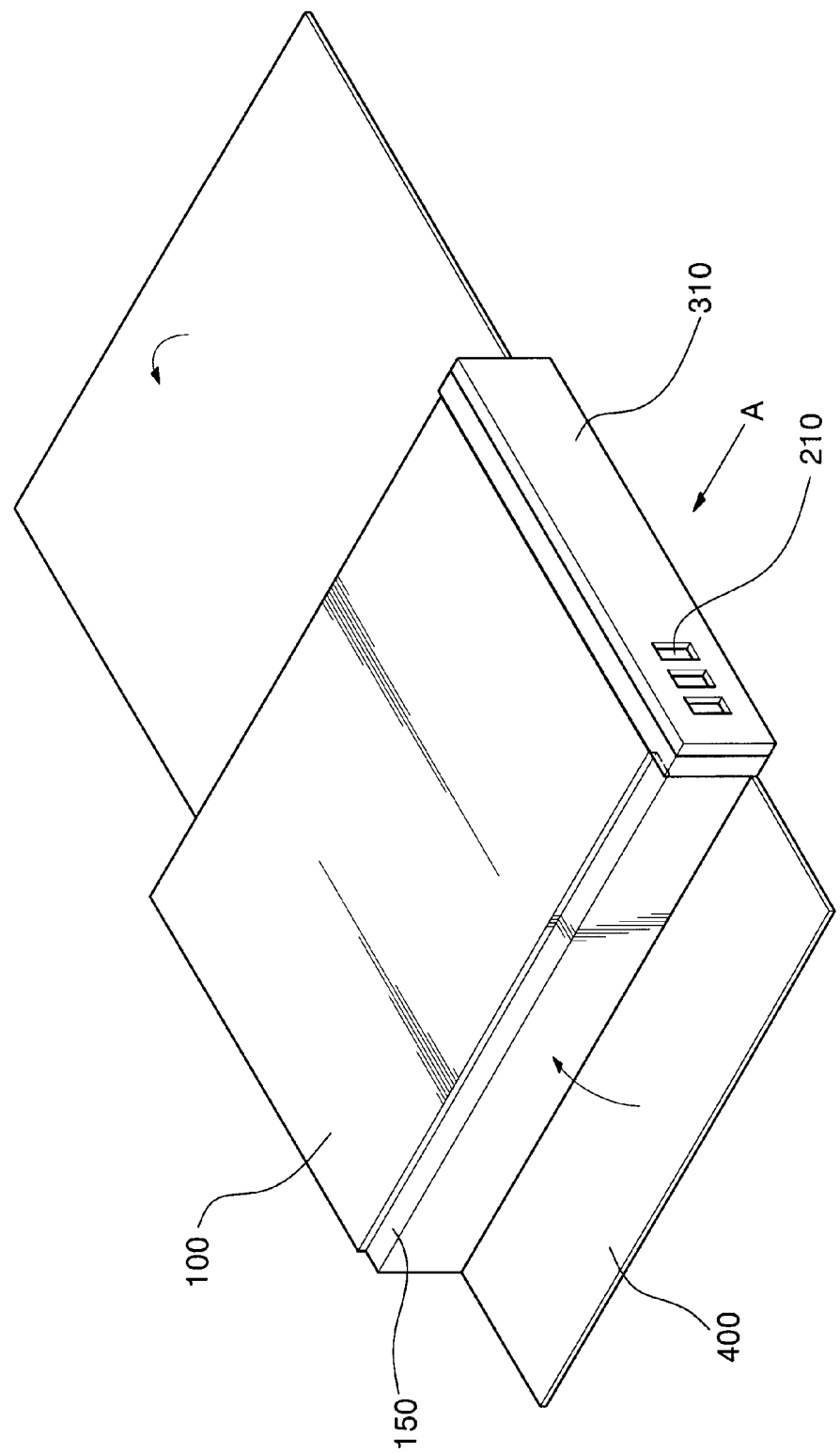
FIG. 1B is a perspective view of the secondary battery of FIG. 1A in which the label is partially wrapped.
Figure 1C:
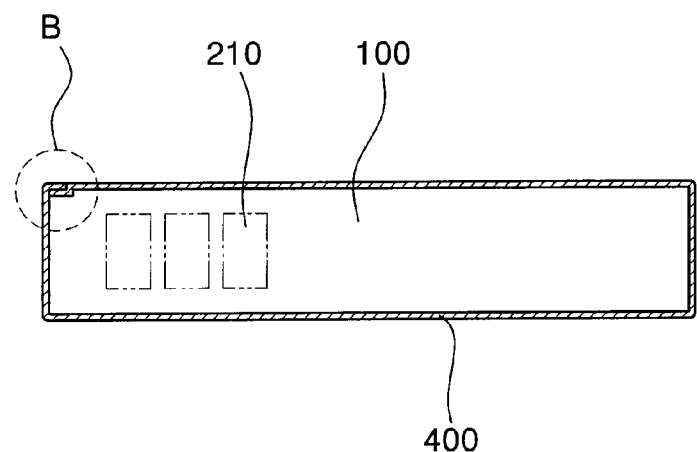
FIG. 1C is a top view of the secondary battery of FIG. 1A, viewed from the direction indicated by reference character A in FIG. 1B, having the wrapped label.
Figure 1D:
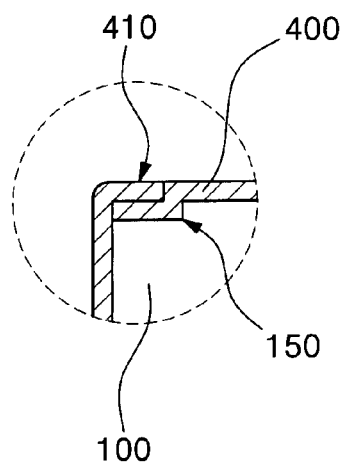
FIG. 1D is an enlarged view of region B of FIG. 1C.

FIG. 1A is an exploded perspective view of a secondary battery according to an embodiment of the present invention, FIG. 1B is a perspective view of the secondary battery of FIG. 1A in which the label is partially wrapped, FIG. 1C is a top view of the secondary battery of FIG. 1A, viewed from the direction indicated by the reference character A in FIG. 1B having the wrapped label, and FIG. 1D is an enlarged view of region B of FIG. 1C.

Referring to FIGS. 1A to 1D, the secondary battery includes a bare cell 100, and a protection circuit board 200, which is formed over the bare cell 100. The protection circuit board 200 is electrically connected to the bare cell 100, and thus prevents abnormal conditions that raise safety concerns such as overcharge, overdischarge, overcurrent, etc.

As shown, upper and lower case members 310 and 330 may be positioned over and under the bare cell 100, and a label 400 is adhered on side surfaces of the bare cell 100.

The bare cell 100 may be a lithium ion cell using liquid electrolytes, or a lithium polymer cell using solid polymer electrolytes or gel electrolytes. Further, the bare cell 100 may be formed in any one of prismatic, cylindrical and pouch types depending on the shape of the can accommodating the electrode assembly. When the bare cell 100 is a lithium ion cell, the bare cell 100 may be formed by putting an electrode assembly into a can formed of a metal such as aluminum using a deep drawing method, covering a top of the can with a cap assembly, and injecting an electrolyte, which can be injected into the can before being covered with the cap assembly. When the bare cell 100 is a lithium polymer cell, it may be formed by putting an electrode assembly into a lower surface of a pouch-shaped casing having a space for the electrode assembly, and covering the lower surface with a top surface of the pouch-shaped casing to seal the bare cell 100. As used herein, unless specifically indicated otherwise, the term "bare cell" refers interchangeably to either a can or a pouch-shaped casing accommodating the electrode assembly. Moreover, other techniques and other materials may be used for the can in addition to or instead of aluminum.

The electrode assembly accommodated in the bare cell 100 is formed in a jelly-roll configuration by stacking and winding a positive electrode plate formed by applying a positive electrode active material on a positive electrode collector, a negative electrode plate formed by applying a negative electrode active material on a negative electrode collector, and a separator interposed between the positive electrode plate and the negative electrode plate.

Further, uncoated portions having no active material thereon are formed on the positive and negative electrode plates, wherein the positive electrode uncoated portion is connected with a positive electrode tab, and the negative electrode uncoated portion is connected with a negative electrode tab.

The positive and negative electrode collectors may be formed of a material selected from the group consisting of stainless steel, nickel, copper, aluminum and an alloy thereof, and preferably, the positive electrode collector is formed of aluminum or an aluminum alloy and the negative electrode collector may be formed of copper or a copper alloy, which maximizes efficiency of the battery.

The separator is interposed between the positive and negative electrode plates to prevent a short circuit between the both electrode plates and enable lithium ions to move. The separator may be formed of a polyolefin-based polymer layer such as polyethylene (PE) and polypropylene (PP) or a multi-layer thereof, but is not restricted thereto.

According to the embodiment of FIGS. 1A to 1D, a stepped portion 150 is formed at a surface of the bare cell 100, which can be a can or a pouch-shaped casing accommodating the electrode assembly. The stepped portion 150 of the bare cell 100 defines a label overlap accommodating space in which a label overlapping portion 410 is accommodated.

The stepped portion 150 prevents an increase in the overall thickness of the secondary battery due to the overlap of the label when the label 400 is adhered on outer surfaces of the bare cell 100. In particular, the stepped portion 150 may have a height that is 90%~110% of the thickness of the label 400 in order to prevent an increase in the thickness of the secondary battery due to the overlap of the label 400. For example, the height of the stepped portion 150 may be equal to thickness of the label 400. Herein, the term "height" of the stepped portion 150 refers to the distance by which the surface of the bare cell 100 is displaced by the stepped portion 150.

Herein, the term "width" of the stepped portion 150 refers to a perpendicular distance from an edge of the bare cell 100 to the step of the stepped portion 150. The width of the stepped portion 150 may be more than 5 mm in order to prevent the label overlapping portion 410 from being detached easily by external action such as scratching, and so on. On the other hand, if the width of the stepped portion 150 is too great, the inner space of the bare cell 100 may be reduced to an undesirable extent. Accordingly, as a non-limiting example, the width of the stepped portion 150 may be less than 10 mm or, more particularly, may be more than 5 mm and less than 10 mm.

The stepped portion 150 may be formed in an angular or round configuration at an edge of a side surface of the bare cell 100. Alternatively, the stepped portion 150 may be formed in the middle part of the bare cell 100. The side surface may be a long side of the bare cell 100.

The shape and position of the stepped portion 150 are not limited to the embodiments described herein and may be changed and modified in various ways by a person skilled in the art.

Further, the stepped portion 150 may also extend into the upper and/or lower case members 310 and 330, respectively, so that the label 400 can extend onto sides of the upper and/or lower case members 310 and 330 without creating an increase in the thickness of the secondary battery.

Here, since the stepped portion 150 includes an indention formed in the bare cell 100 accommodating the electrode assembly, the portion of the bare cell 100 including the stepped portion 150 may have a smaller inner space than other portions without the stepped portion 150. Accordingly, as a non-limiting example, the positive electrode plate and the negative electrode plate may be connected with the positive electrode tab and the negative electrode tab in regions inside the bare cell 100 other than the region having the stepped portion 100. Further, the wound ends of the electrode assembly may be located in a region other than the region having the stepped portion 100.

The stepped portion 150 may be formed by pressing a surface of the bare cell 100. Alternatively, the stepped portion 150 may be formed by cutting a surface of the bare cell 100.

The protection circuit board 200 is formed at a side of the bare cell 100 and electrically connected thereto. The protection circuit board 200 checks the state of the battery to detect abnormal conditions such as overcharge, overdischarge and overcurrent, and blocks charging and discharging when an abnormal condition or operation is detected, thereby providing stability and reliability to the battery.

The protection circuit board 200 includes protection elements, e.g., a protection circuit, PTC and a fuse on a printed circuit board (PCB) having an interconnection pattern, and at least one external connection terminal 210 to electrically connect an external device with the bare cell 100. The protection circuit board 200 may be connected with the bare cell 100 using a lead plate electrically connected with the bare cell, and may be directly connected with the electrode tab connected with the electrode assembly.

The upper and lower case members 310 and 330 may be attached over and under the bare cell 100 to protect the bare cell 100 from external impact. The upper case member 310 may have a hole 315 for exposing the external connection terminal.

The upper case member 310 may be formed as an integrated, embedded, or cover type.

As an integrated type, the upper case member 310 may be formed by connecting the protection circuit board to the top surface of the bare cell 100, filling a gap between the bare cell 100 and the protection circuit board with nylon-based synthetic resin, and injection molding the resin at low temperature and pressure.

As an integrated type, the upper case member 310 may be formed by embedding the protection circuit board into synthetic resin, and combining the protection circuit board-embedded upper case member 310 to the top surface of the bare cell 100.

As a cover-shaped type, the upper case member 310 may be formed by connecting the protection circuit board onto the bare cell 100, and combining the upper case member 310 previously formed of synthetic resin to the bare cell 100 to which the protection circuit board is connected.

The label 400 is formed of an electrically insulating material such as, for example, vinyl or polymer, thereby protecting the outer surface of the bare cell 100, providing a place to print a product name, and allowing the bare cell 100 to be electrically insulated from outside.

The label 400 includes an adhesive layer adhered on an outer surface of the bare cell 100, a support layer on which a manufacturer's name and other identifying information are printed, and a film layer that protects the printed letters on the support layer.

When the label 400 surrounds the outer surface of the bare cell 100, the label overlapping portion 410 formed in an overlapping portion of both ends (i.e., a starting point and an ending point) of the label 400 is disposed in the stepped portion 150 formed in the outer surface of the bare cell 100, which prevents the thickness of the secondary battery from being increased due to the overlapping of the label 400.

Figure 2A:
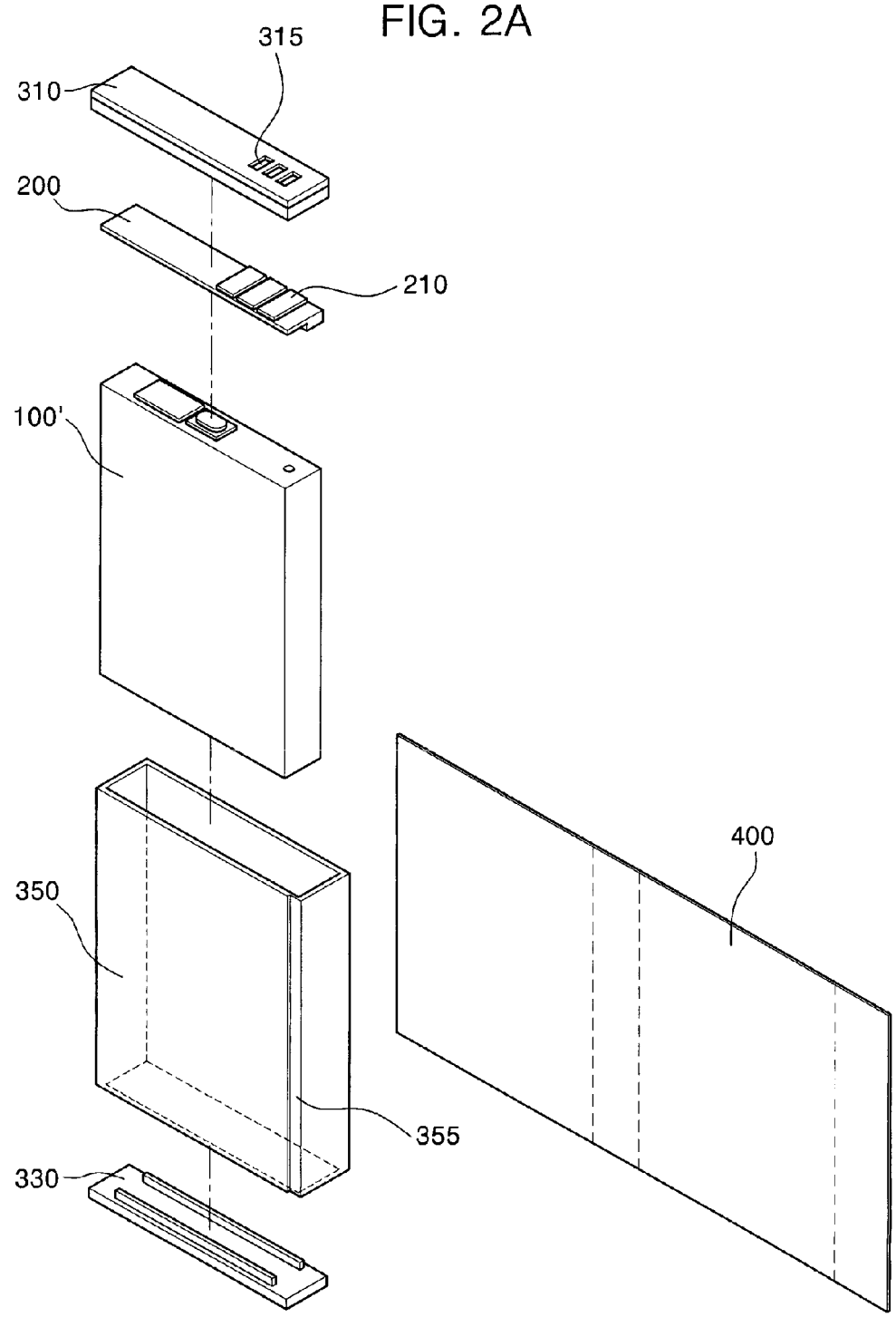
FIG. 2A is an exploded perspective view of a secondary battery according to another embodiment of the present invention.
Figure 2C:
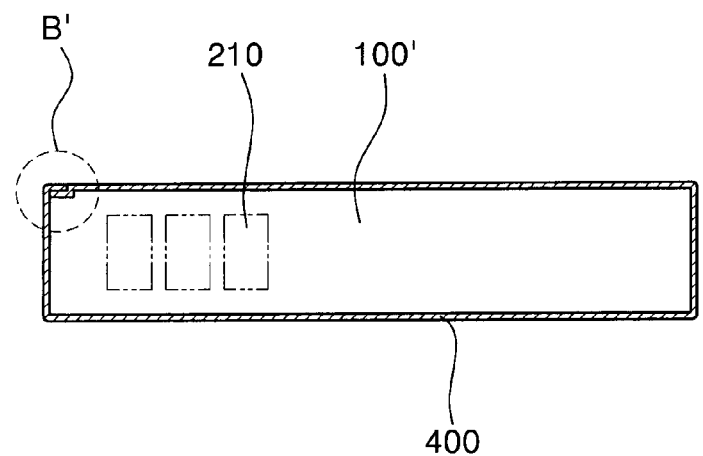
FIG. 2C is a top view of the secondary battery of FIG. 2A, viewed from the direction indicated by reference character A' in FIG. 2B.
Figure 2D:
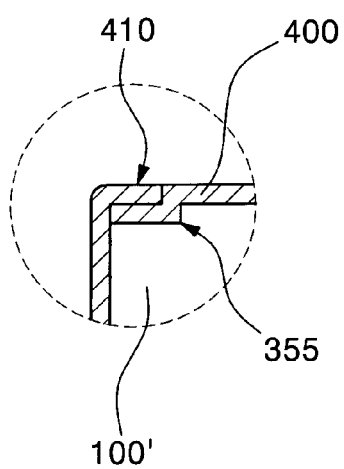
FIG. 2D is an enlarged view of region B' of FIG. 2C.

FIG. 2A is an exploded perspective view of a secondary battery according to another embodiment of the present invention, FIG. 2B is a perspective view of the secondary battery of FIG. 2A in which the label 400 is partially wrapped, FIG. 2C is a top view of the secondary battery of FIG. 1A, viewed from the direction indicated by the reference character A' in FIG. 2B, and FIG. 2D is an enlarged view of region B' of FIG. 2C.

Referring to FIGS. 2A to 2D, the secondary battery includes a bare cell 100' and a protection circuit board 200 formed over the bare cell 100' and electrically connected with the bare cell 100 to prevent abnormal conditions that raise safety concerns, such as overcharge, overdischarge and overcurrent.

The configuration and function of the bare cell 100' and the protection circuit board 200 in the embodiment according to FIGS. 2A to 2D are the same as those in the embodiment shown in FIGS. 1A to 1D, so a detailed description will be omitted.

The embodiment according to FIGS. 2A to 2D differs from the embodiment according to FIGS. 1A to 1D by having an outer case member 350, and a stepped portion 355 is formed in the outer case member 350 and not in the bare cell 100'.

As shown in FIG. 2A, upper and lower case members 310 and 330 may be positioned over and under of the bare cell 100', and the outer case member 350 surrounds side surfaces of the bare cell 100' to protect the bare cell 100' from external impact. The label 400 is adhered on the outer case member 350 and not on the bare cell 100' itself as in the embodiment of FIGS. 1A to 1D.

The configuration and function of the upper case member 310, the lower case member 330 and the label 400 in the embodiment of FIGS. 2A to 2D are generally the same as those in the embodiment of FIGS. 1A to 1D, so a detailed description will be omitted.

The outer case member 350 may be separated from the upper and lower case members 310 and 330 as shown in FIGS. 2A to 2D, or may be formed integrally with the upper case member 310 and/or the lower case member 330.

The outer case member 350 may be a metallic case included in an inner pack type secondary battery and formed of a material selected from aluminum, stainless steel and an equivalent thereof or may be a case included in a hard pack type secondary battery and may be formed by injection molding and formed of plastic or an equivalent thereof.

According to the embodiment of FIGS. 2A to 2D, a stepped portion 355 is formed at a surface of the outer case member 350. The stepped portion 355 defines an overlap accommodating space in which a label overlapping portion 410 is accommodated.

The stepped portion 355 is formed to accommodate a label overlapping portion 410 created where ends of the label 400 meet and overlap. The stepped portion 355 prevents an increase in thickness of the secondary battery due to the overlap of the label 400. In particular, the stepped portion 355 may have a height that is 90%~110% of the thickness of the label 400 in order to prevent an increase in the thickness of the secondary battery due to the overlap of the label. For example, the height of the stepped portion 355 may be equal to thickness of the label. 400. In this embodiment, the term "height" of the stepped portion 355 refers to the distance by which the surface of the case member 350 is displaced by the stepped portion 150.

In this embodiment, the term "width" of the stepped portion 355 refers to a perpendicular distance from an edge of the case member 350 to the step of the stepped portion 150. The width of the stepped portion 355 may be in order to prevent the label overlapping region 410 from being detached easily by external action such as scratching, and so on.

On the other hand, if the width of the step 355 is too great, the inner space of the outer case 350 may be reduced to an undesirable extent.

Accordingly, as a non-limiting example, the width of the stepped portion 355 may be less than 10 mm, or more particularly, may be more than 5 mm and less than 10 mm.

The stepped portion 355 may be formed in an angular or round configuration at an edge of a side surface of the outer case 350. The edge may be a long side of the outer case 350. Alternatively, the stepped portion 355 may be formed in the middle part of the outer case 350.

The shape and position of the stepped portion 355 is not limited to the embodiment described herein, and thus can be changed and modified in various ways by a person skilled in the art.

Also, the stepped portion 350 may also extend into the upper and lower case members 310 and 330, so that the label 400 can extend onto sides of the upper and/or lower case members 310 and 330 without creating an increase in the thickness of the secondary battery.

The stepped portion 355 may be formed by pressing or cutting a surface of the outer case member 350.

The embodiment of FIGS. 1A to 1D and the embodiment of FIGS. 2A to 2D have been separately described herein, but aspects of the present invention may be realized by applying both embodiments. That is, the label overlap accommodating space created by a stepped portion may be formed in both the bare cell 100 and the outer case member 350 positioned on the side surface of the bare cell 100. The stepped portions formed in the bare cell 100 and the outer case 350 may be formed at the same location of the secondary battery. In this case, the stepped portion 150 formed in the bare cell 100 does not accommodate the label 400, but rather accommodates the stepped portion 350 of the outer case member 350 to reduce the thickness of the secondary battery.

According to aspects of the present invention, a stepped portion is formed in an outer surface of a can or a pouch-shaped casing accommodating an electrode assembly of a secondary battery as described above to thereby dispose a label overlapping portion in the space formed by the stepped portion, thereby preventing the overall thickness of the secondary battery from being increased by the thickness of the label overlapping portion and so that the outer thickness of the battery can be uniformly maintained. Also, when a bare cell is used with an outer case member, the stepped portion may be formed in the outer case member to obtain the same effect as the above.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A secondary battery comprising:
   a bare cell including an electrode assembly and a can or a pouch-shaped casing accommodating the electrode assembly, wherein the can or the pouch-shaped casing has a first end and a second end substantially opposite to the first end;
   a protection circuit board electrically connected to the bare cell; and
   a label adhered around a side surface of the can or the pouch-shaped casing,
   wherein the can or the pouch-shaped casing is continuous to entirely cover the electrode assembly and includes a stepped portion in the side surface to accommodate the label such that a portion of the label is on the stepped portion and a portion of the label is outside of the stepped portion, wherein the stepped portion extends in a direction generally from the first end to the second end and substantially orthogonally to a winding direction of the label.

2. The secondary battery according to claim 1, wherein a first end portion of the label is in the stepped portion and wherein a second end portion of the label overlaps the first end portion.

3. The secondary battery according to claim 1, wherein a height of the stepped portion is 90%~110% of a thickness of the label.

4. The secondary battery according to claim 1, wherein a width of the stepped portion is more than 5 mm and less than 10 mm.

5. The secondary battery according to claim 1, wherein the stepped portion is formed by pressing the side surface of the bare cell.

6. The secondary battery according to claim 1, wherein the stepped portion is formed by cutting the side surface of the bare cell.

7. The secondary battery according to claim 1, wherein the stepped portion is at an edge of a side surface of bare cell, or in a middle part of the bare cell.

8. The secondary battery according to claim 7, wherein the side surface is a long side of the bare cell.

9. The secondary battery according to claim 1, wherein the electrode assembly is formed by winding:
   a positive electrode plate connected with a positive electrode tab;
   a negative electrode plate connected with a negative electrode tab; and
   a separator located between the positive and negative electrode plates.

10. The secondary battery according to claim 9, wherein the positive and negative electrode tabs are connected with the positive and negative electrode plates, respectively, in a region other than a region in which the stepped portion is formed.

11. The secondary battery according to claim 9, wherein the electrode assembly has a wound end in a region other than the region in which the stepped portion is formed.

12. The secondary battery according to claim 1, further comprising an upper case member and a lower case member attached to the bare cell.

13. A secondary battery comprising:
    a bare cell containing an electrode assembly, the bare cell being continuous to entirely cover the electrode assembly and having a stepped recess on a first end, on a second end substantially opposite to the first end and on one of a plurality of side surfaces;
    a label wrapped entirely around the side surfaces of the bare cell, wherein a first end portion of the label overlaps a second end portion of the label that is in the stepped recess, and
    wherein the stepped recess extends in a direction generally from the first end to the second end and substantially orthogonally to a winding direction of the label.

14. A secondary battery comprising:
    a bare cell including an electrode assembly and a can or a pouch-shaped casing accommodating the electrode assembly, wherein the can or the pouch-shaped casing has a first end and a second end substantially opposite to the first end;
    a protection circuit board electrically connected to the bare cell;
    an outer case member that surrounds and extends along substantially entire side surfaces of the bare cell; and
    a label adhered around a surface of the outer case member,
    wherein the outer case member is continuous to entirely cover the bare cell and includes a stepped portion on the surface extending in a direction generally from the first end to the second end substantially orthogonally to a winding direction of the label and wherein a portion of the label is on the stepped portion.

15. The secondary battery according to claim 14, wherein a first end portion of the label is in the stepped portion and wherein a second end portion of the label overlaps the first end portion.

16. The secondary battery according to claim 14, wherein a height of the stepped portion is 90%~110% of a thickness of the label.

17. The secondary battery according to claim 14, wherein a width of the stepped portion is more than 5 mm and less than 10 mm.

18. The secondary battery according to claim 14, wherein the stepped portion is formed by pressing a surface of the outer case member.

19. The secondary battery according to claim 14, wherein the stepped portion is formed by cutting a surface of the outer case member.

20. The secondary battery according to claim 14, wherein the stepped portion is formed at an edge of a side surface of the outer case member, or in a middle part of the outer case member.

21. The secondary battery according to claim 20, wherein the side surface is a long side of the outer case member.

22. The secondary battery according to claim 14, wherein the outer case member comprises aluminum, stainless steel or plastic.

23. The secondary battery according to claim 14, wherein the bare cell is a lithium ion cell or a lithium polymer cell.

24. The secondary battery according to claim 14, wherein the bare cell is formed in a prismatic, cylindrical or pouch shape.

25. The secondary battery according to claim 14, wherein the bare cell has a stepped portion.

26. The secondary battery according to claim 25, wherein the stepped portion of the bare cell is generally aligned with the stepped portion of the outer case member.

27. The secondary battery according to claim 14, further comprising an upper case member and a lower case member attached to the outer case member.

28. A secondary battery comprising:
- a bare cell containing an electrode assembly;
- an outer case member that surrounds and extends along substantially entire side surfaces of the bare cell, the outer case member being continuous to entirely cover the bare cell having a first end, a second end substantially opposite to the first end and a stepped recess that extends in a direction generally from the first end to the second end;
- a label wrapped entirely around the outer case member, wherein a first end portion of the label overlaps a second end portion of the label that is accommodated in the stepped recess,
- wherein the stepped recess extends in a direction which is substantially orthogonal to a winding direction of the label.

* * * * *

UNITED STATES PATENT AND TRADEMARK OFFICE
CERTIFICATE OF CORRECTION

PATENT NO. : 8,557,435 B2
APPLICATION NO. : 12/126432
DATED : October 15, 2013
INVENTOR(S) : Ki-Sung Hong et al.

It is certified that error appears in the above-identified patent and that said Letters Patent is hereby corrected as shown below:

In the Claims

Column 9, Claim 7, line 56      After "surface of"

Insert -- the --

Signed and Sealed this
Twenty-fourth Day of March, 2015

Michelle K. Lee
*Director of the United States Patent and Trademark Office*